United States Patent
Tashiro et al.

(10) Patent No.: US 9,056,625 B2
(45) Date of Patent: Jun. 16, 2015

(54) VEHICLE STEERING SYSTEM

(71) Applicant: JTEKT CORPORATION, Osaka-shi, Osaka (JP)

(72) Inventors: Takashi Tashiro, Kashihara (JP); Akihiro Takazato, Kashiwara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/222,981

(22) Filed: Mar. 24, 2014

(65) Prior Publication Data

US 2014/0290413 A1 Oct. 2, 2014

(30) Foreign Application Priority Data

Apr. 1, 2013 (JP) .................. 2013-076380

(51) Int. Cl.
*B62D 1/04* (2006.01)
*B66F 9/075* (2006.01)
*B66F 9/24* (2006.01)
*B62D 5/00* (2006.01)

(52) U.S. Cl.
CPC ........... *B62D 1/043* (2013.01); *Y10T 74/20256* (2015.01); *B66F 9/07568* (2013.01); *B66F 9/24* (2013.01); *B62D 5/001* (2013.01)

(58) Field of Classification Search
CPC ....... B62D 1/046; B62D 1/043; E02F 9/2007; Y10T 74/20256
USPC .............................. 180/315, 318, 170; 74/552
See application file for complete search history.

(56) References Cited

U.S. PATENT DOCUMENTS

| | | | | |
|---|---|---|---|---|
| 4,562,957 A | * | 1/1986 | Nakagawa et al. ...... | 237/12.3 R |
| 5,335,743 A | * | 8/1994 | Gillbrand et al. ............. | 180/178 |
| 7,621,365 B2 | * | 11/2009 | Egan ............................. | 180/315 |
| 2004/0050612 A1 | * | 3/2004 | Katae et al. .................... | 180/315 |
| 2004/0143379 A1 | * | 7/2004 | Borroni-Bird et al. ......... | 701/36 |
| 2013/0046442 A1 | | 2/2013 | Hayama et al. | |

FOREIGN PATENT DOCUMENTS

| | | |
|---|---|---|
| EP | 1 990 308 A1 | 11/2008 |
| JP | A-05-092769 | 4/1993 |
| JP | A-11-227614 | 8/1999 |
| JP | A-2003-220955 | 8/2003 |
| JP | A-2004-142615 | 5/2004 |
| JP | A-2008-213769 | 9/2008 |

(Continued)

OTHER PUBLICATIONS

Jul. 4, 2014 Extended European Search Report issued in European Application No. 14161661.5.

*Primary Examiner* — Karen Beck
(74) *Attorney, Agent, or Firm* — Oliff PLC

(57) ABSTRACT

There is provided a vehicle steering system that facilitates fine steering of a vehicle body regardless of the operated state of a steering wheel. The steering wheel is provided with a lever used to operate the steering wheel. A support mechanism supports and rotates the lever relative to the steering wheel such that the lever is tiltable in the rightward direction and the leftward direction relative to the vehicle body regardless of a turning angle of the steering wheel. The support mechanism includes a support member fixed to the steering wheel, a base disposed on the support member and rotatably supported by the support member, and a gear mechanism used to rotate the base as the steering wheel is turned.

9 Claims, 10 Drawing Sheets

(56) References Cited

FOREIGN PATENT DOCUMENTS

| JP | A-2009-288872 | 12/2009 | | |
| JP | A-2012-001092 | 1/2012 | | |
| JP | EP2786955 A1 * | 10/2014 | ............. | B66F 9/075 |
| JP | EP2796956 A1 * | 10/2014 | ............. | B60F 9/075 |
| WO | WO 92/06860 A1 | 4/1992 | | |

* cited by examiner

VEHICLE STEERING SYSTEM

INCORPORATION BY REFERENCE

The disclosure of Japanese Patent Application No. 2013-076380 filed on Apr. 1, 2013 including the specification, drawings and abstract, is incorporated herein by reference in its entirety.

BACKGROUND OF THE INVENTION

1. Field of the Invention

The invention relates to a steering system for a material handling vehicle or the like.

2. Description of the Related Art

In a material handling vehicle such as a forklift, a lifting operation lever for a material handling device is located on the right side of an operator seated on a cab seat and a steering wheel (steering member) is located on the left side of the operator seated on the cab seat. Therefore, the operator operates the lifting operation lever with his/her right hand while operating the steering wheel with his/her left hand. A knob (operating portion) for operating the steering wheel is turnably attached to the steering wheel, and the operator grips the knob with his/her hand to turn the steering wheel. In order to load a cargo on forks, it is necessary to make fine adjustment of the forks in the right-left direction. As described in Japanese Patent Application Publication No. 2012-1092 (JP 2012-1092 A), Japanese Patent Application Publication No. 2009-288872 (JP 2009-288872 A), Japanese Patent Application Publication No. 2008-213769 (JP 2008-213769 A), and Japanese Patent Application Publication No. 5-92769 (JP 5-92769 A), fine adjustment of the forks in the right-left direction is made by operating the knob to finely steer a vehicle body.

In the forklift according to the related art, the knob may be located at a position at which the operator has difficulty in operating the knob depending on the operated state (turning angle) of the steering wheel. In this case, because it is difficult to operate the steering wheel as intended by the operator with the use of the knob, it is difficult to make fine adjustment of the forks in the right-left direction through fine steering of the vehicle body. FIG. 10A illustrates the neutral position of a steering wheel 200. For example, when the turning angle of the steering wheel 200 is a turning angle at which a knob 201 is located on the right side of the center of the steering wheel 200 as viewed from the operator as illustrated in FIG. 10B, it is difficult to operate the steering wheel 200 as intended by the operator with the use of the knob 201. Therefore, in this case, it is difficult to finely adjust the orientation of the forks, that is, the orientation of the vehicle body.

SUMMARY OF THE INVENTION

One object of the invention is to provide a vehicle steering system that facilitates fine steering of a vehicle body regardless of the operated state of a steering member.

A vehicle steering system according to an aspect of the invention includes:
 a steering member operated to steer a vehicle;
 an operating portion disposed on the steering member to operate the steering member;
 a support mechanism that supports and rotates the operating portion relative to the steering member such that the operating portion is movable in two prescribed directions relative to a vehicle body regardless of an operated state of the steering member;
 a first detector that detects a fact that the operating portion is operated in a first direction out of the two directions; and
 a second detector that detects a fact that the operating portion is operated in a second direction out of the two directions.

According to the above aspect, the operating portion is movable relative to the steering member in the two prescribed direction relative to the vehicle body. When the operating portion is operated in the first direction out of the two directions, the fact that the operating portion is operated in the first direction is detected by the first detector. When the operating portion is operated in the second direction output the two directions, the fact that the operating portion is operated in the second direction is detected by the second detector. Thus, it is possible to finely steer the vehicle body in the first direction when the operating portion is operated in the first direction, and to finely steer the vehicle body in the second direction that differs from the first direction when the operating portion is operated in the second direction. Thus, fine steering of the vehicle body is facilitated regardless of the operated state of the steering member.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
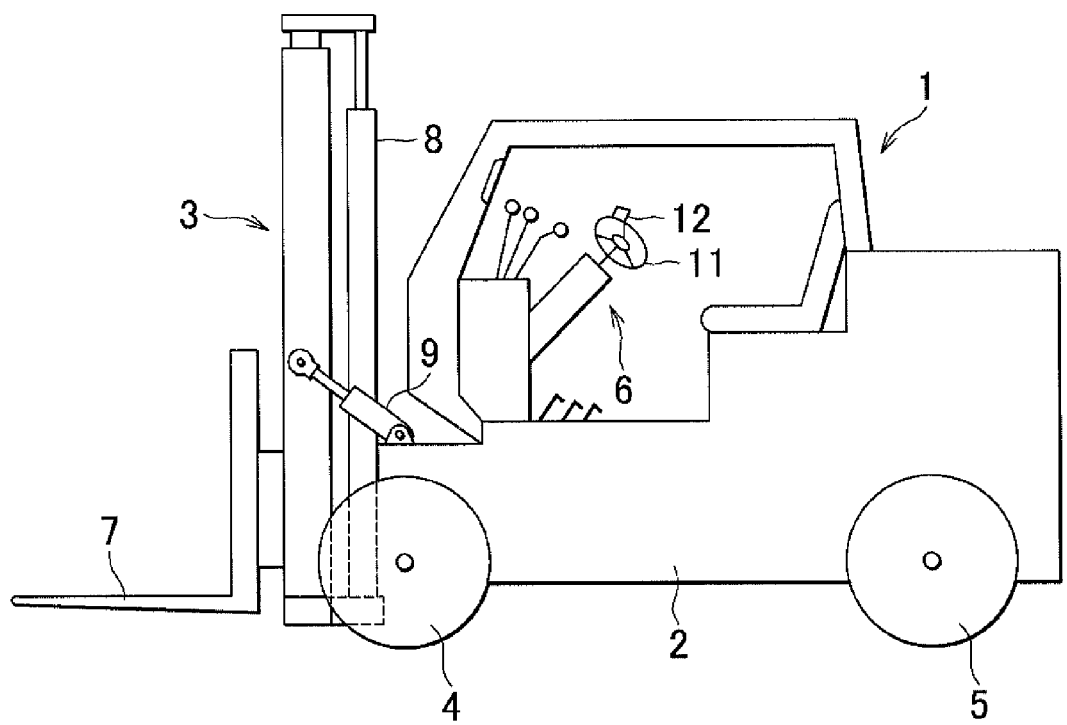
FIG. 1 is a side view schematically illustrating the configuration of a forklift that is a material handling vehicle to which a vehicle steering system according to an embodiment of the invention is applied.

Hereinafter, example embodiments of the invention will be described with reference to the accompanying drawings. FIG. 1 is a side view schematically illustrating the configuration of a forklift 1 that is a material handling vehicle to which a vehicle steering system according to an embodiment of the invention is applied. The forklift 1 includes a vehicle body 2, a material handling device 3 disposed at the front of the vehicle body 2, front wheels 4 that serve as drive wheels and support the vehicle body 2, rear wheels 5 that serve as steered wheels and support the vehicle body 2, and a vehicle steering system 6 that steers the rear wheels 5.

Although not illustrated in FIG. 1, the forklift 1 further includes a drive source for the vehicle, such as an engine, and a hydraulic pump that serves as a hydraulic power source. The power generated by the drive source is transferred to a transmission, which performs a forward-backward movement switching operation and a gear shifting operation, via a torque converter, and is then transmitted to the right and left front wheels 4 via a differential. A forward clutch and a reverse clutch are incorporated in the transmission.

As is well known, the material handling device 3 includes forks 7 supported so as to be movable up and down and tiltable relative to the vehicle body 2, lift cylinders 8 used to move the forks 7 up and down, and tilt cylinders 9 used to tilt the forks 7. The forks 7 are members on which a cargo is placed. The vehicle steering system 6 is a so-called steer-by-wire system in which there is no mechanical connection between a steering wheel 11, which serves as a steering member, and a steering mechanism that changes the steered angle of the rear wheels 5, which serve as the steered wheels. The steering wheel 11 is provided with a lever 12 that is an operating portion used to operate the steering wheel 11.

Figure 2:
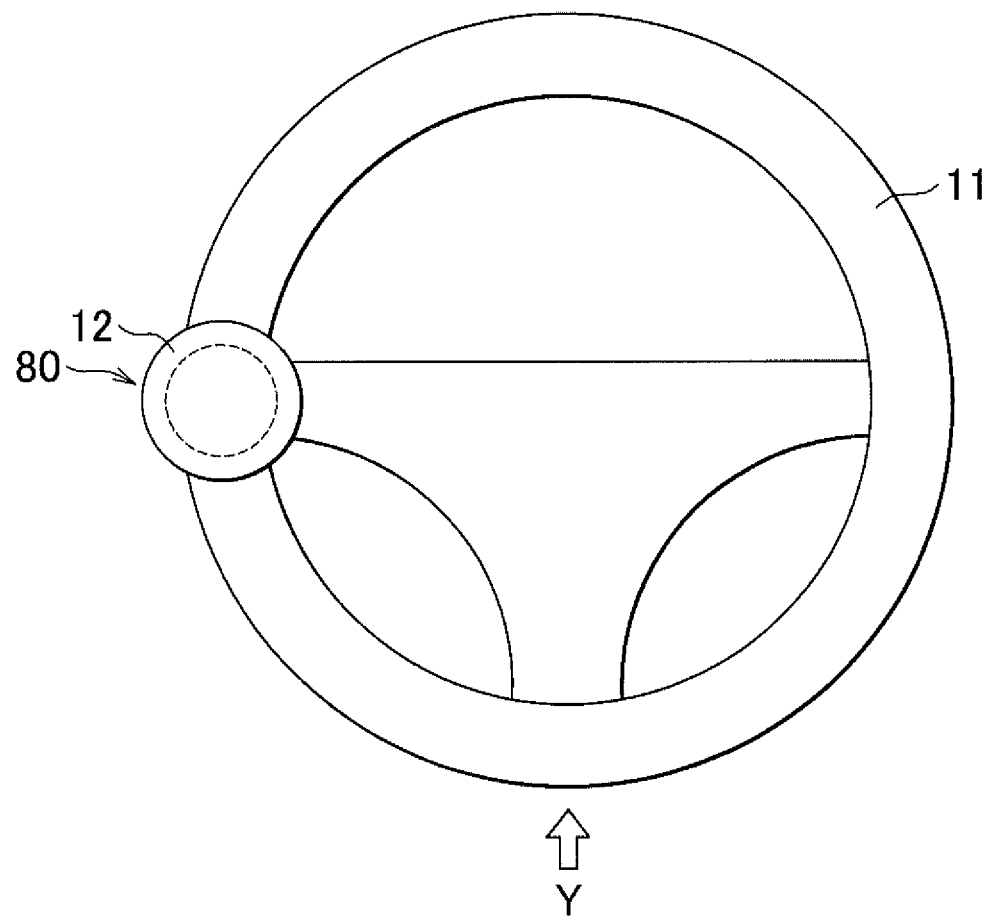
FIG. 2 is a view schematically illustrating a steering wheel as viewed from an operator seated on a cab seat.
Figure 3:
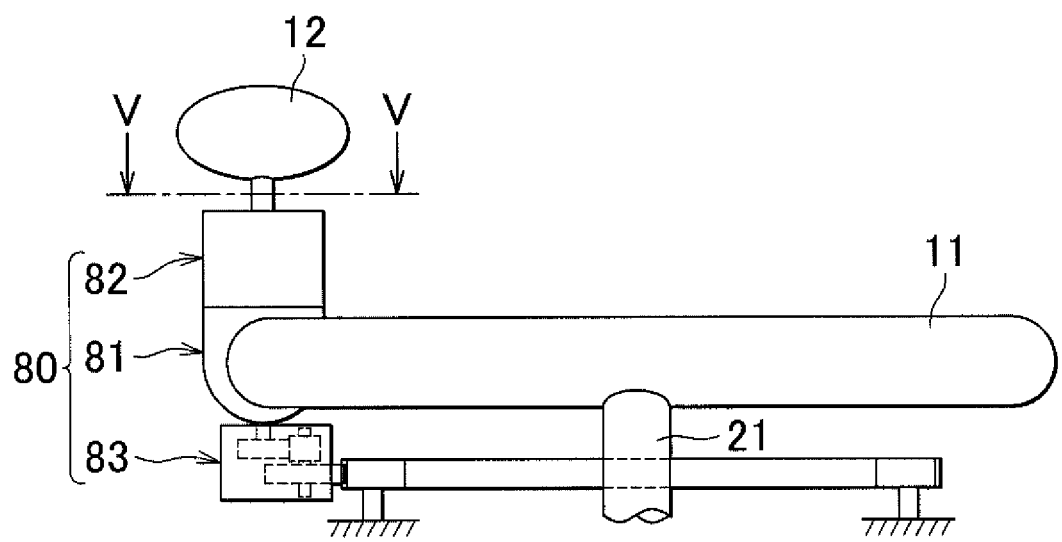
FIG. 3 is a view of the steering wheel as viewed from a direction of an arrow Y in FIG. 2.
Figure 4:
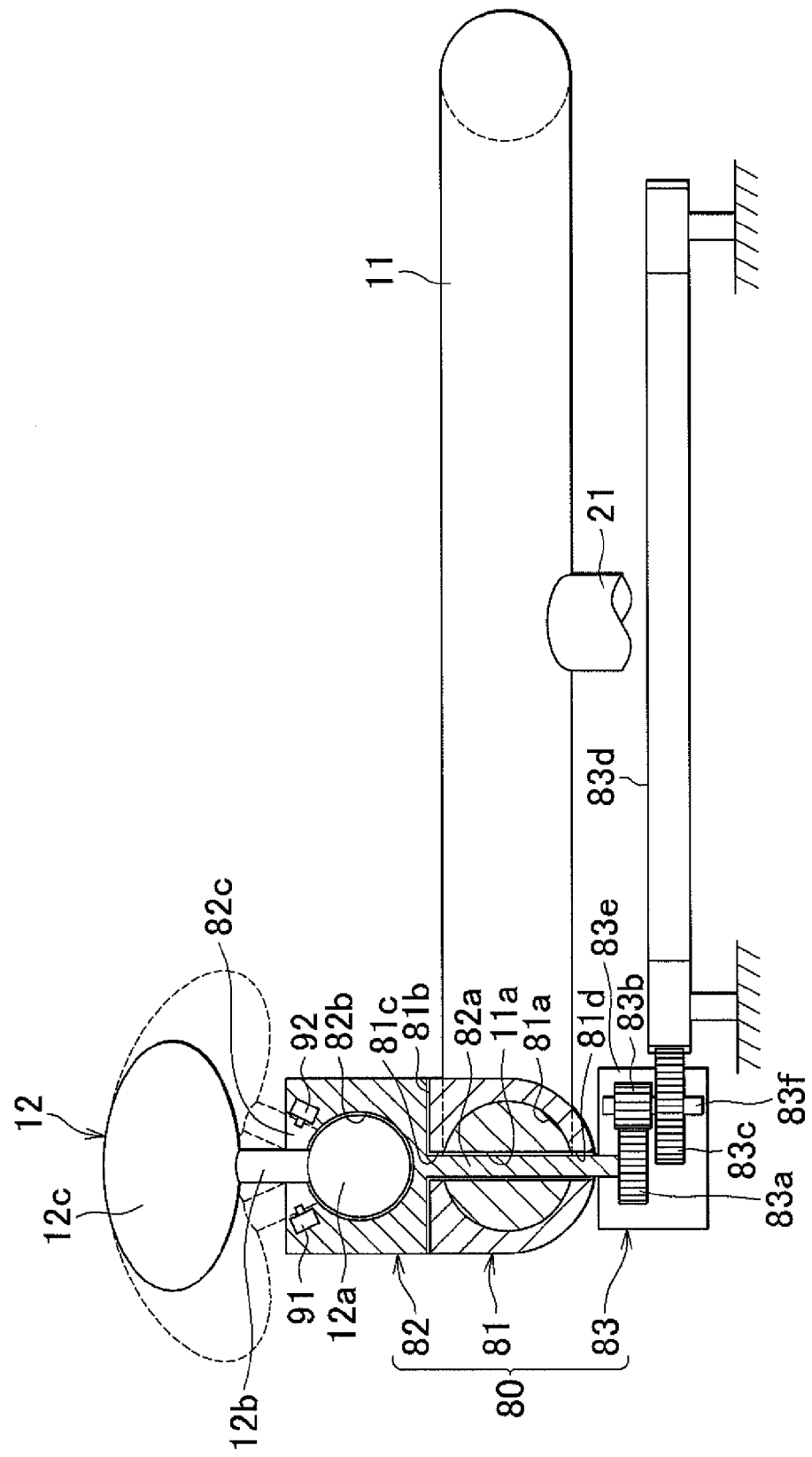
FIG. 4 is a partially-cutaway enlarged view of the steering wheel in FIG. 3.
Figure 5:
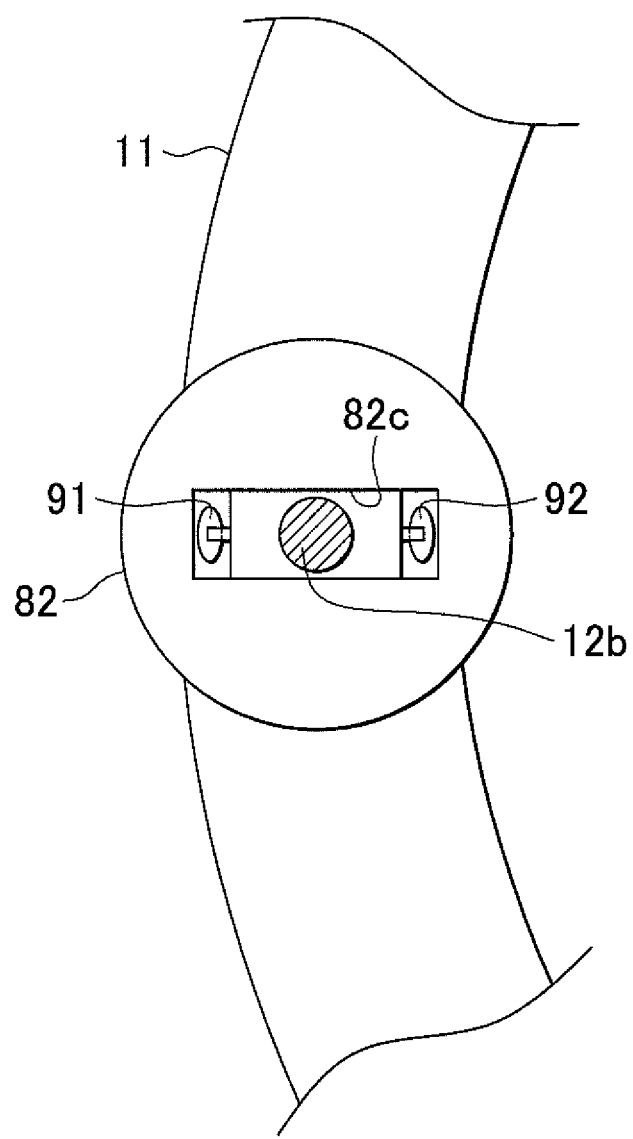
FIG. 5 is an enlarged sectional view taken along the line V-V in FIG. 3.

FIG. 2 is a view schematically illustrating the steering wheel 11 as viewed from an operator seated on a cab seat. FIG. 3 is a view of the steering wheel 11 as viewed from a direction of an arrow Y in FIG. 2. FIG. 4 is a partially-cutaway enlarged view of the steering wheel 11 in FIG. 3. FIG. 5 is an enlarged sectional view taken along the line V-V in FIG. 3. The steering wheel 11 is connected to an upper end of a rotary shaft 21 that is rotatably supported by the vehicle body. The lever 12 is supported, through the intermediary of a support mechanism 80, by the steering wheel 11 so as to be tiltable (movable) to the right (in the rightward direction) and to the left (in the leftward direction) relative to the vehicle body regardless of the operated state of the steering wheel 11, that is, regardless of the turning angle of the steering wheel 11.

The lever 12 and the support mechanism 80 will be described below in detail with reference to FIG. 2 to FIG. 5. In the description of the lever 12 and the support mechanism 80, "upper side" means the upper side of each of the sheets on which FIG. 3 and FIG. 4 are drawn, and "lower side" means the lower side of each of the sheets on which FIG. 3 and FIG. 4 are drawn. Further, "planar view" means a view as viewed from the upper side of each of the sheets on which FIG. 3 and FIG. 4 are drawn.

The support mechanism 80 includes a support member 81 fixed to the steering wheel 11, a base 82 disposed on the support member 81 and rotatably supported by the support member 81, and a gear mechanism 83 used to rotate the base 82 as the steering wheel 11 is turned.

The support member 81 has a circular shape in a planar view. The support member 81 has a through-hole 81a through which the steering wheel 11 passes. The support member 81 is fixed to the steering wheel 11 in a state where the steering wheel 11 passes through the through-hole 81a. An upper end portion of the support member 81 protrudes upward from a top face of the steering wheel 11. A top face of the upper end portion of the support member 81 is formed in a flat face 81b, and the flat face 81b is perpendicular to the central axis of the rotary shaft 21. A through-hole 11a extending in the up-down direction is formed in a portion of the steering wheel 11, to which the support member 81 is fixed. Through-holes 81c, 81d extending in the up-down direction and communicated with the through-hole 11a are formed in an upper portion and a lower portion of the support member 81, respectively.

The base 82 is a columnar member having a circular shape in a planar view. The base 82 has a shaft 82a extending downward from the center of its bottom face. The shaft 82a is rotatably passed through the through-holes 81c, 81d of the support member 81 and the through-hole 11a of the steering wheel 11. A lower end portion of the shaft 82a protrudes downward from the support member 81. The bottom face of the base 82 is placed on the flat face 81b of the support member 81. The base 82 has a spherical space 82b formed therein. A recess 82c, which communicates with the space 82b and which has a rectangular shape that is elongate in the right-left direction of the vehicle body 2 in a planar view, is formed at the center of a top face of the base 82. A left inner wall and a right inner wall of the recess 82c in the right-left direction of the vehicle body 2 are formed as inclined faces the distance between which decreases from the top face of the base 82 downward.

The gear mechanism 83 is used to rotate the base 82 about the shaft 82a in accordance with the turning of the steering wheel 11. The gear mechanism 83 rotates the base 82 such that the longitudinal direction (the direction in which the long side of the recess 82c extends) of the recess 82c of the base 82 in a planar view always coincides with the right-left direction relative to the vehicle body 2 regardless of the operated state of the steering wheel 11, that is, regardless of the turning angle of the steering wheel 11. The gear mechanism 83 includes a first gear 83a, a second gear 83b, a third gear 83c, a fourth gear 83d, and a gear case 83e.

The gear case 83e is attached to the support member 81 via an attachment member (not illustrated). The lower end portion of the shaft 82a of the base 82 extends into the gear case 83e. A rotary shaft 83f that extends parallel to the shaft 82a is disposed in the gear case 83e. The rotary shaft 83f is rotatably attached to the gear case 83e. The first gear 83a is fixed to the lower end portion of the shaft 82a of the base 82 in the gear case 83e so as to be rotatable together with the shaft 82a. The second gear 83b and the third gear 83c are fixed to the rotary shaft 83f so as to be rotatable together with the rotary shaft 83f. The second gear 83b engages with the first gear 83a. The third gear 83c is disposed below the second gear 83b. A portion of the third gear 83c, which faces the rotary shaft 21, protrudes from the gear case 83e.

The fourth gear 83d is fixed to the vehicle body 2, at a position below the steering wheel 11. The fourth gear 83d has an annular shape that is concentric with the steering wheel 11 and that is smaller in diameter than the steering wheel 11 in a planar view, and teeth are formed on the outer circumferential face of the fourth gear 83d. The fourth gear 83d engages with the portion of the third gear 83c, which protrudes from the gear case 83e.

For example, when the steering wheel 11 is turned to the left, that is, turned in the counterclockwise direction in FIG. 2, the third gear 83c and the second gear 83b rotate in the counterclockwise direction in a planar view and the first gear 83a rotates in the clockwise direction in a planar view. Thus, the shaft 82a of the base 82 rotates in the clockwise direction in a planar view, and therefore the base 82 rotates in the clockwise direction about the central axis of the shaft 82a.

On the other hand, when the steering wheel 11 is turned to the right, that is, turned in the clockwise direction in FIG. 2, the third gear 83c and the second gear 83b rotate in the clockwise direction in a planar view and the first gear 83a rotates in the counterclockwise direction in a planar view. Thus, the shaft 82a of the base 82 rotates in the counterclockwise direction in a planar view, and therefore the base 82 rotates in the counterclockwise direction about the central axis of the shaft 82a.

The gear ratio between the third gear 83c and the second gear 83b and the gear ratio between the second gear 83b and the first gear 83a are set such that the longitudinal direction (the direction in which the long side of the recess 82c extends) of the recess 82c of the base 82 in a planar view always coincides with the right-left direction relative to the vehicle body 2 regardless of the turning angle of the steering wheel 11. Thus, the longitudinal direction (the direction in which the long side of the recess 82c extends) of the recess 82c of the base 82 in a planar view always coincides with the right-left direction relative to the vehicle body 2 regardless of the turning angle of the steering wheel 11.

The lever 12 includes a spherical portion 12a rotatably fitted in the space 82b of the base 82, a rod 12b of which one end is connected to the spherical portion 12a and the other end extends upward through the recess 82c of the base 82, and a grip (knob) 12c attached to the other end of the rod 12b. That is, the lever 12 and the base 82 are connected to each other with a ball joint. The rod 12b has a columnar shape. The diameter of the rod 12b is slightly smaller than the length of the short side of the recess 82c of the base 82 in a planar view. Thus, the lever 12 is tiltable only to the right (in the rightward direction) and to the left (in the leftward direction) relative to the vehicle body 2 from the neutral position at which the rod 12b is located at the center between the left inner wall and the right inner wall of the recess 82c. Although not illustrated in the drawings, the base 82 is provided with an urging member such as a spring that always urges the lever 12 toward the neutral position.

The left inner wall of the recess 82c of the base 82 is provided with a first detector 91 that defects the fact that the lever 12 is operated (tilted) to the left (in the leftward direction) relative to the vehicle body 2. The right inner wall of the recess 82c of the base 82 is provided with a second detector 92 that defects the fact that the lever 12 is operated (tilted) to the right (in the rightward direction) relative to the vehicle body 2. The first detector 91 and the second detector 92 are each, for example, a limit switch.

Figure 6:
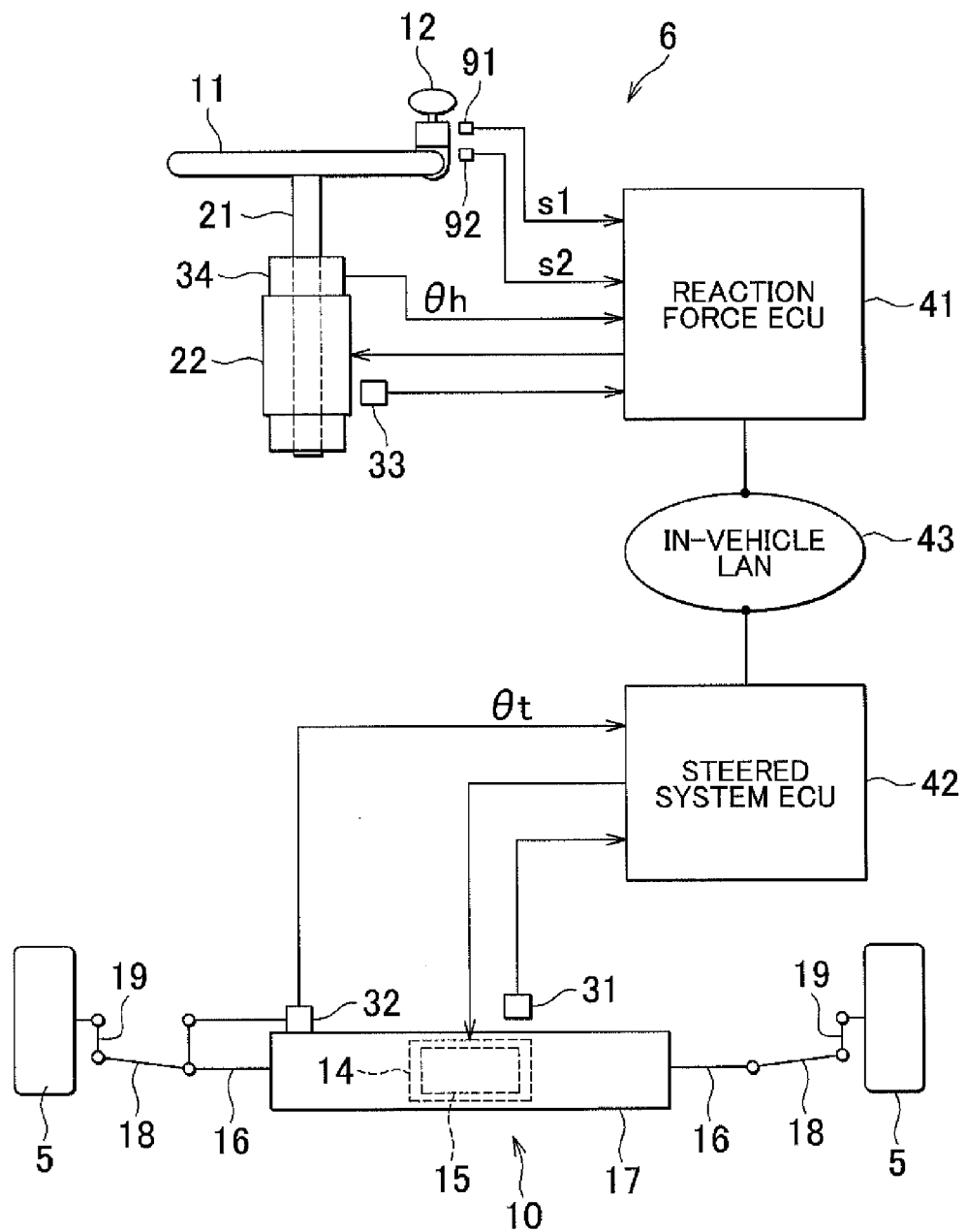
FIG. 6 is a schematic diagram illustrating the configuration of the vehicle steering system.

FIG. 6 is a schematic diagram illustrating the configuration of the vehicle steering system 6. In the vehicle steering system 6, a steered system motor 14 is driven in response to a turning operation of the steering wheel 11 and an operation of the lever 12. The rear wheels 5 are steered by converting the rotary motion of a rotor of the steered system motor 14 into a linear motion (linear motion in the right-left direction of the vehicle body 2) of a steered shaft 16 and then converting the linear motion of the steered shaft 16 into a steered motion of the rear wheels 5.

The steered shaft 16 is movably attached to a housing 17 attached to the vehicle body 2 so as to extend in the axial direction (the right-left direction relative to the vehicle body 2) of the housing 17. The steered system motor 14 is disposed so as to be coaxial with the steered shaft 16 and is incorporated in the housing 17. In the present embodiment, a brushless motor is adopted as the steered system motor 14. The steered system motor 14 is provided with a rotation angle sensor 31, such as a resolver, which detects a rotation angle of the rotor of the steered system motor 14.

A motion conversion mechanism 15 that converts the rotary motion of the steered system motor 14 into a linear motion in the axial direction of the steered shaft 16 is disposed in the housing 17. The motion conversion mechanism 15 is, for example, a ball screw mechanism. The motion of the steered shaft 16 is transmitted to the rear wheels 5 via tie rods 18 and knuckle arms 19 to change the toe angle (steered angle) of the rear wheels 5. That is, the steered system motor 14, the motion conversion mechanism 15, the steered shaft 16, the tie rods 18, and the knuckle arms 19 constitute a steering mechanism 10.

In the present embodiment, the steered angle of the rear wheels 5 is changed in such a direction that the vehicle is turned to the left (left steering direction) when the steered system motor 14 rotates in the forward rotation direction, and the steered angle of the rear wheels 5 is changed in such a direction that the vehicle is turned to the right (right steering direction) when the steered system motor 14 rotates in the reverse rotation direction. The wheel alignment is set such that the rear wheels 5 are returned to the steered positions, at which the vehicle travels straight ahead, by self-aligning torque when the steered system motor 14 is not driven.

A steered angle sensor 32 that detects a rudder angle of the vehicle, that is, a steered angle $\theta t$ of the rear wheels 5 is attached to the housing 17. The steered angle sensor 32 is, for example, a potentiometer that detects a displacement of the steered shaft 16 corresponding to the steered angle $\theta t$. In the present embodiment, the steered angle sensor 32 detects an amount of change in the steered angle of the rear wheels 5 from the neutral position (the steered angle at which the vehicle travels straight ahead) of the rear wheels 5, as the steered angle $\theta t$. In the present embodiment, an amount of change in the steered angle of the rear wheels 5 in the left steering direction from the neutral position is output, for example, as a positive value, and an amount of change in the steered angle of the rear wheels 5 in the right steering direction from the neutral position is output, for example, as a negative value.

The steering wheel 11 is connected to the rotary shaft 21 rotatably supported by the vehicle body 2 as described above. A reaction force motor 22 is disposed around the rotary shaft 21. By applying rotary torque from the reaction force motor 22 to the rotary shaft 21, reaction torque (operation reaction force) is applied to the steering wheel 11. The reaction force motor 22 is disposed so as to be coaxial with the rotary shaft 21. In the present embodiment, a brushless motor is adopted as the reaction force motor 22. The reaction force motor 22 is provided with a rotation angle sensor 33, such as a resolver, which detects a rotation angle (rotor angle) of a rotor of the reaction force motor 22.

A steering angle sensor 34 that detects a steering angle (turning angle) $\theta h$ of the steering wheel 11, that is, the rotation angle of the rotary shaft 21 is disposed around the rotary shaft 21. In the present embodiment, the steering angle sensor 34 detects an amount of rotation (rotation angle) of the rotary shaft 21 in the forward rotation direction and the reverse rotation direction from a prescribed reference angle. The steering angle sensor 34 outputs an amount of rotation in the left steering direction from the reference angle, for example, as a positive value, and outputs an amount of rotation in the right steering direction from the reference angle, for example, as a negative value. As will be described later, in the present embodiment, because the rotation angle of the rotary shaft 21 corresponding to the neutral position ($\theta t=0$) of the rear wheels 5 may vary, the prescribed reference angle of the rotary shaft 21 does not always correspond to the neutral position of the rear wheels 5.

The rotation angle sensor 33, the steering angle sensor 34, the first detector 91, and the second detector 92 are connected to a reaction force electronic control unit 41. Hereinafter, the electronic control unit will be referred to as "ECU". The rotation angle sensor 31 and the steered angle sensor 32 are connected to a steered system ECU 42. The reaction force ECU 41 and the steered system ECU 42 are connected to each other via an in-vehicle LAN 43. An output signal from the steering angle sensor 34, an output signal s1 from the first detector 91, and an output signal s2 from the second detector 92 are provided also to the steered system ECU 42 via the reaction force ECU 41 and the in-vehicle LAN 43.

Figure 7:
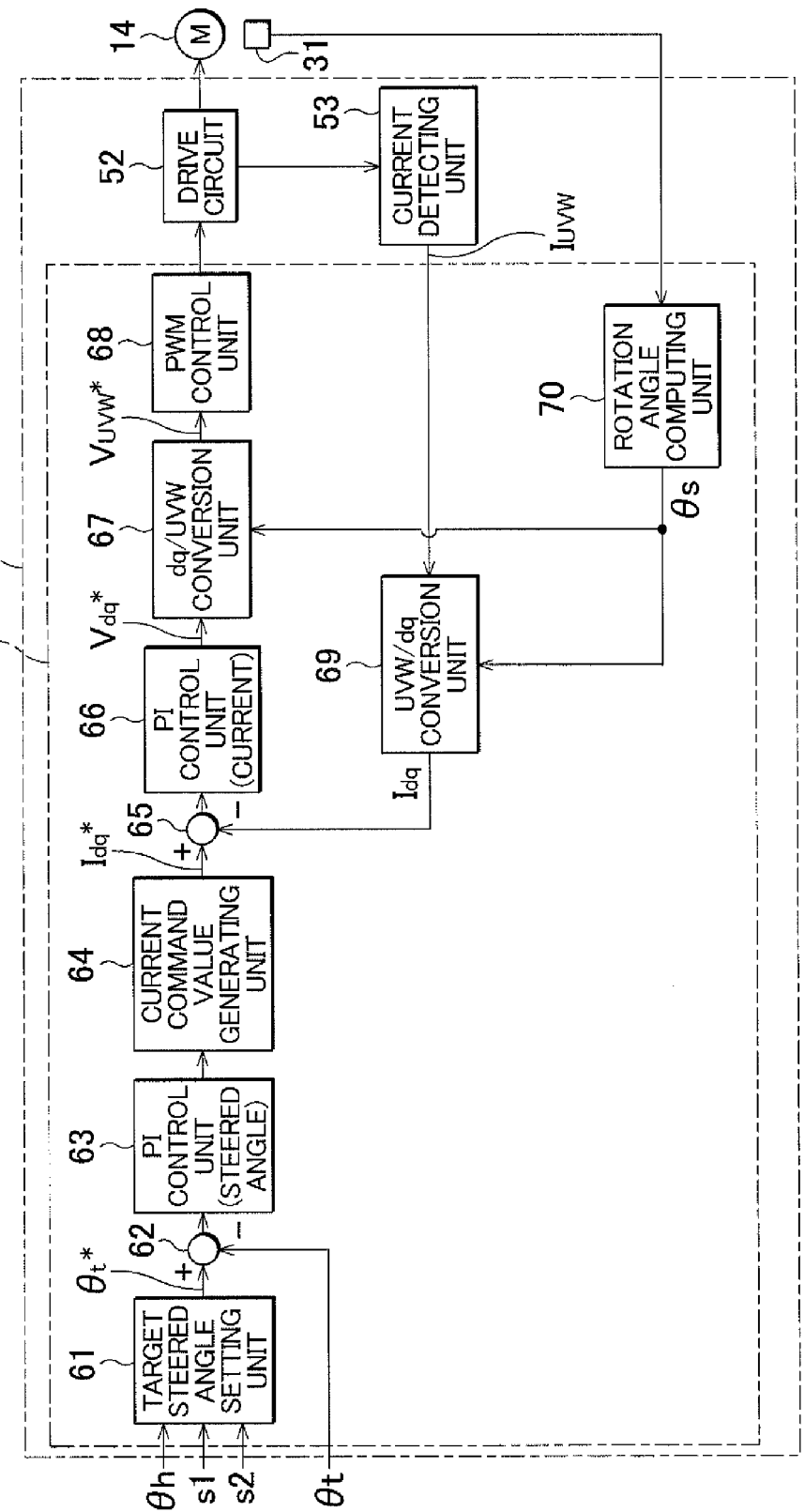
FIG. 7 is a block diagram illustrating the electrical configuration of a steered system ECU.

The steered system ECU 42 executes drive control on the steered system motor 14 on the basis of the output signals from the first detector 91, the second detector 92, the steering angle sensor 34, the steered angle sensor 32, and the rotation angle sensor 31. FIG. 7 is a block diagram illustrating the electrical configuration of the steered system ECU 42. The steered system ECU 42 includes a microcomputer 51, a drive circuit (inverter circuit) 52 that is controlled by the microcomputer 51 to supply electric power to the steered system motor 14, and a current detecting unit 53 that detects a motor current that is applied to the steered system motor 14.

Figure 8:
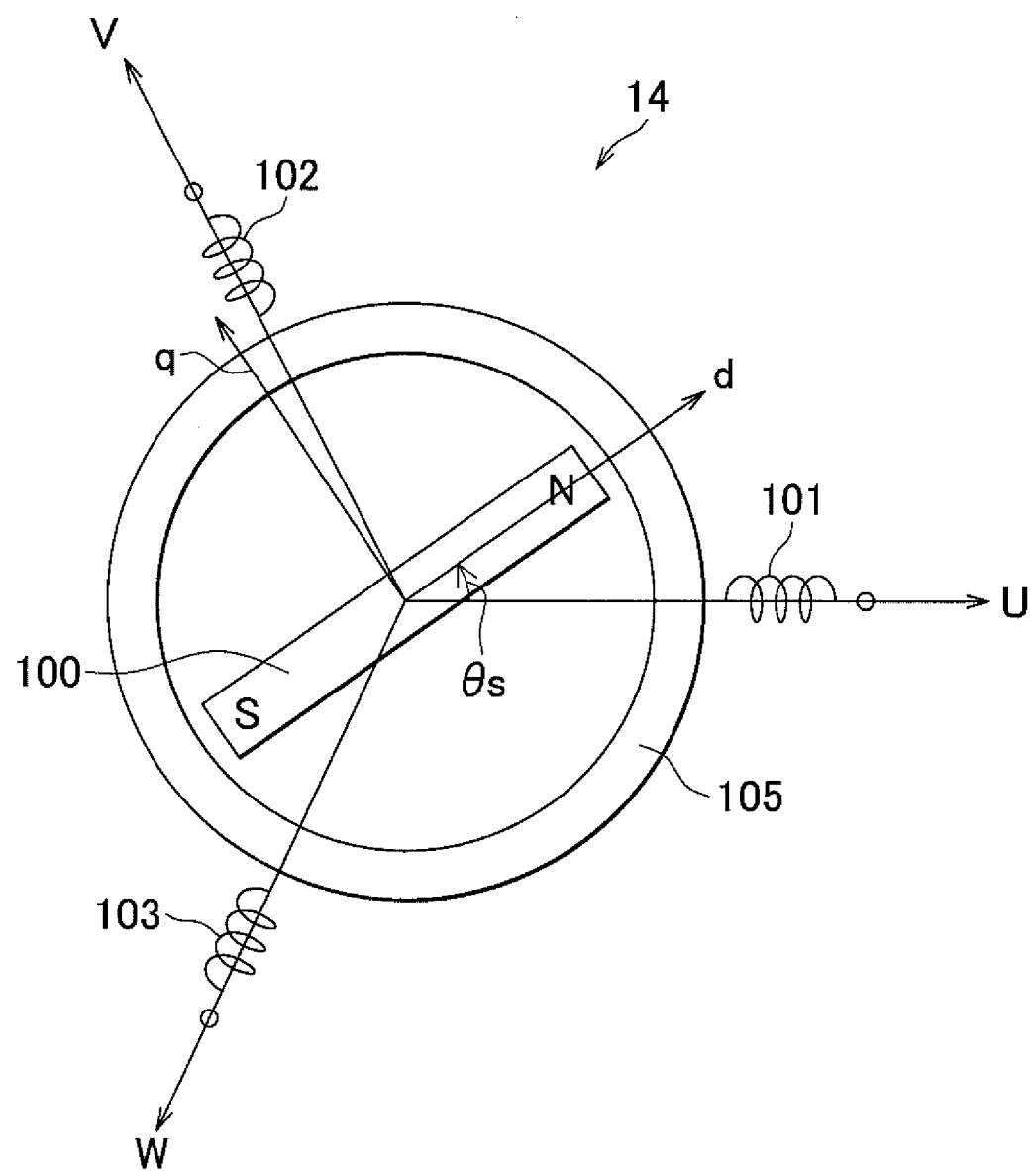
FIG. 8 is a schematic view illustrating the configuration of a steered system motor.

The steered system motor 14 is, for example, a three-phase brushless motor, and includes a rotor 100 that serves as a field magnet and a stator 105 provided with a U-phase stator coil 101, a V-phase stator coil 102, and a W-phase stator coil 103, as schematically illustrated in FIG. 8. The steered system motor 14 may be an inner rotor type motor in which a stator is disposed radially outward of a rotor so as to face the rotor or may be an outer rotor type motor in which a stator is disposed inside a cylindrical rotor so as to face the rotor.

There is defined a three-phase fixed coordinate system (UVW coordinate system) having a U-axis, a V-axis, and a W-axis, which extend in the directions of the U-phase stator coil 101, the V-phase stator coil 102, and the W-phase stator coil 103, respectively. In addition, there is defined a two-phase rotating coordinate system (dq coordinate system) having a d-axis (an axis of a magnetic pole) that extends in a magnetic pole direction of the rotor 100 and having a q-axis (torque axis) that extends in a direction perpendicular to the d-axis in a rotary plane of the rotor 100. The dq coordinate system is a rotating coordinate system that rotates together with the rotor 100. In the dq coordinate system, because only a q-axis current contributes to generation of torque of the rotor 100, the d-axis current is set to zero and the q-axis current is controlled depending on the desired torque. A rotor angle θs indicating the rotational phase of the rotor 100 is an electrical angle of the d-axis with respect to the U-axis. The dq coordinate system is a rotating coordinate system based on the rotor angle θs. By using the rotor angle θs, coordinate conversion between the UVW coordinate system and the dq coordinate system is carried out.

The microcomputer 51 includes a CPU and memories (such as a ROM, a RAM, and a nonvolatile memory), and serves as multiple function processing units by executing prescribed programs. The multiple function processing units include a target steered angle setting unit 61, an angle deviation computing unit 62, a proportional-integral (PI) control unit 63, a current command value generating unit 64, a current deviation computing unit 65, a proportional-integral (PI) control unit 66, a dq/UVW conversion unit 67, a pulse width modulation (PWM) control unit 68, a UVW/dq conversion unit 69, and a rotation angle computing unit 70.

The rotation angle computing unit 70 computes a rotor angle θs of the steered system motor 14 on the basis of an output signal from the rotation angle sensor 31.

The target steered angle setting unit 61 sets a target steered angle θt* on the basis of a detected steering angle θh detected by the steering angle sensor 34, an output signal s1 from the first detector 91, and an output signal s2 from the second detector 92. The details of the operation of the target steered angle setting unit 61 will be described later. The target steered angle θt* set by the target steered angle setting unit 61 is provided to the angle deviation computing unit 62.

The angle deviation computing unit 62 computes a deviation between the target steered angle θt* set by the target steered angle setting unit 61 and a steered angle θt detected by the steered angle sensor 32. The PI control unit 63 executes PI computation on the angle deviation computed by the angle deviation computing unit 62. The current command value generating unit 64 generates a current value, which is a value of current that should be applied to each of the d-axis and the q-axis of the dq coordinate system, as a current command value on the basis of the result of computation executed by the PI control unit 63. Specifically, the current command value generating unit 64 generates a d-axis current command value $I_d^*$ and a q-axis current command value $I_q^*$. Hereinafter, these current command values may be collectively referred to as two-phase current command values $I_{dq}^*$. More specifically, the current command value generating unit 64 generates the q-axis current command value $I_q^*$ and sets the d-axis current command value $I_d^*$ to zero. The two-phase command values $I_{dq}^*$ generated by the current command value generating unit 64 are provided to the current deviation computing unit 65.

The current detecting unit 53 detects a U-phase current $I_U$, a V-phase current $I_V$, and a W-phase current $I_W$ for the steered system motor 14. Hereinafter, these currents may be collectively referred to as three-phase detected currents $I_{UVW}$. The three-phase detected currents $I_{UVW}$ detected by the current detecting unit 53 are provided to the UVW/dq conversion unit 69. The UVW/dq conversion unit 69 converts the three-phase detected currents $I_{UVW}$ in the UVW coordinate system detected by the current detecting unit 53 into two-phase detected currents $I_d$, $I_q$ in the dq coordinate system. Hereinafter, these currents may be collectively referred to as two-phase detected currents $I_{dq}$. The two-phase detected currents $I_{dq}$ are provided to the current deviation computing unit 65. The rotor angle θs computed by the rotation angle computing unit 70 is used for the coordinate conversion in the UVW/dq conversion unit 69.

The current deviation computing unit 65 computes deviations between the two-phase current command values $I_{dq}^*$ generated by the current command value generating unit 64 and the two-phase detected currents $I_{dq}$ provided by the UVW/dq conversion unit 69. More specifically, the current deviation computing unit 65 computes a deviation of the d-axis detected current $I_d$ from the d-axis current command value $I_d^*$ and a deviation of the q-axis detected current $I_q$ from the q-axis current command value $I_q^*$. These deviations are provided to the PI control unit 66.

The PI control unit 66 generates two-phase voltage command values $V_{dq}^*$ (a d-axis voltage command value $V_d^*$ and a q-axis voltage command value $V_q^*$), which are values of voltages that should be applied to the steered system motor 14, by executing the PI computation on the current deviations computed by the current deviation computing unit 65. The two-phase voltage command values $V_{dq}^*$ are provided to the dq/UVW conversion unit 67. The dq/UVW conversion unit 67 converts the two-phase voltage command values $V_{dq}^*$ into three-phase voltage command values $V_{UVW}^*$. The rotor angle θs computed by the rotation angle computing unit 70 is used for the coordinate conversion. The three-phase voltage command values $V_{UVW}^*$ include a U-phase voltage command value $V_U^*$, a V-phase voltage command value $V_V^*$, and a W-phase voltage command value $V_W^*$. The three-phase voltage command values $V_{UVW}^*$ are provided to the PWM control unit 68.

The PWM control unit 68 generates a U-phase PWM control signal, a V-phase PWM control signal, and a W-phase PWM control signal having duty ratios respectively corresponding to the U-phase voltage command value $V_U{}^*$, the V-phase voltage command value $V_V{}^*$, and the W-phase voltage command value $V_W{}^*$, and provides the generated PWM control signals to the drive circuit 52. The drive circuit 52 is a three-phase inverter circuit with the U-phase, the V-phase, and the W-phase. By controlling power elements that constitute the inverter circuit on the basis of the PWM control signals provided by the PWM control unit 68, the voltages corresponding to the three-phase voltage command values $V_{UVW}{}^*$ are applied to the U-phase stator coil 101, the V-phase stator coil 102, and the W-phase stator coil 103 of the steered system motor 14, respectively.

The angle deviation computing unit 62 and the PI control unit 63 constitute an angle feedback controller. The steered angle θt of the rear wheels 5 is controlled so as to approach the target steered angle θt* by the angle feedback controller. The current deviation computing unit 65 and the PI control unit 66 constitute a current feedback controller. The motor currents applied to the steered system motor 14 are controlled so as to approach the two-phase current command values $I_{dq}{}^*$ generated by the current command value generating unit 64 by the current feedback controller.

Next, the operation of the target steered angle setting unit 61 will be described. In the present embodiment, when the turning angle of the steering wheel 11 is in a state at which it is difficult to operate the steering wheel 11 with the use of the lever 12, the forklift 1 can be finely steered by operating the lever 12 relative to the steering wheel 11 in the right-left direction relative to the vehicle body 2. Specifically, when the first detector 91 detects the fact that the lever 12 is operated to the left (in the leftward direction) relative to the vehicle body 2, the target steered angle setting unit 61 increases the target steered angle θt* by a prescribed value in the positive direction. When the second detector 92 detects the fact that the lever 12 is operated to the right (in the rightward direction) relative to the vehicle body 2, the target steered angle setting unit 61 decreases the target steered angle θt* by a prescribed value in the negative direction. Thus, the fine steering of the forklift 1 in the right-left direction can be performed through the operation of the lever 12 in the right-left direction.

Figure 9:
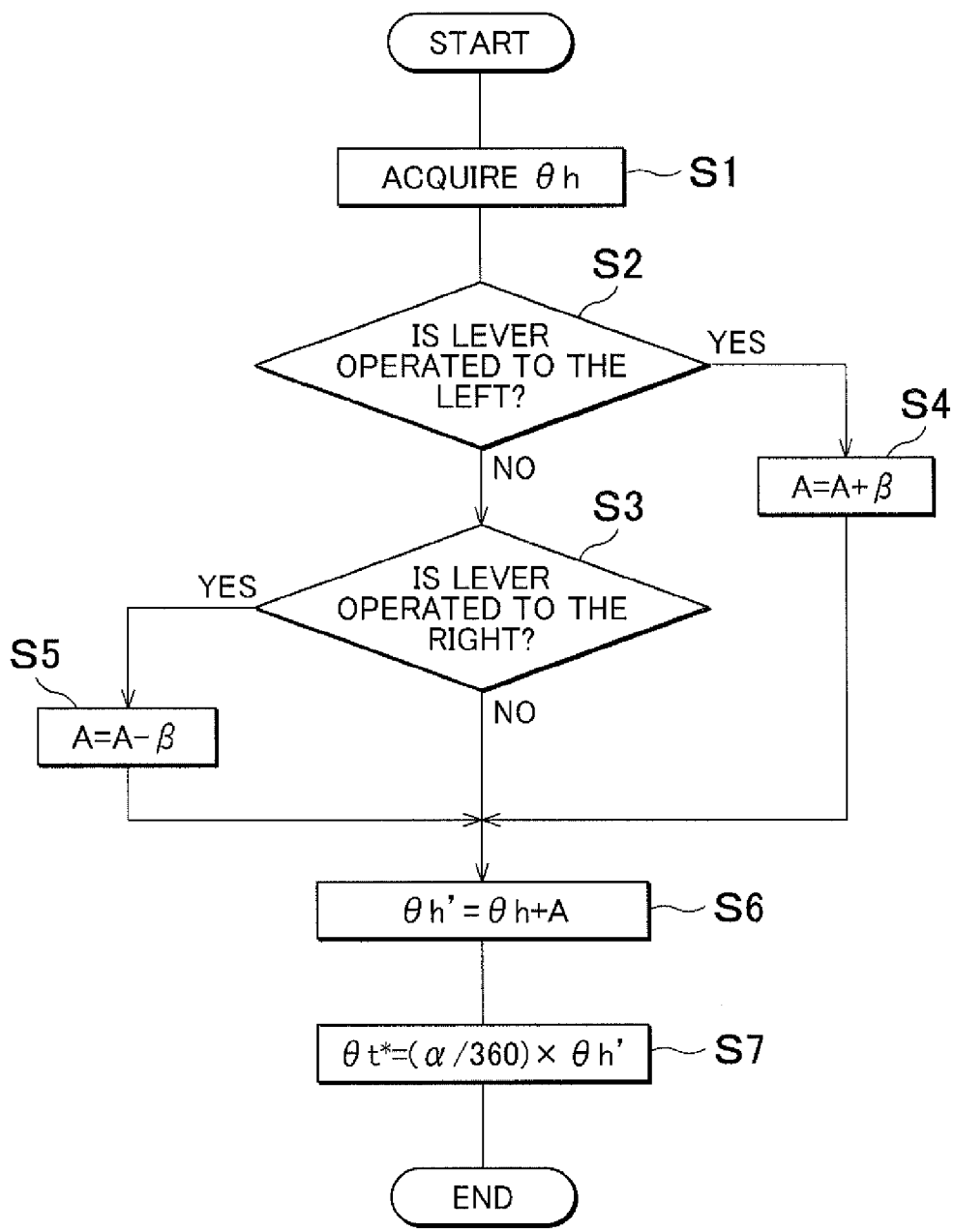
FIG. 9 is a flowchart illustrating the operation of a target steered angle setting unit.
Figure 10A:
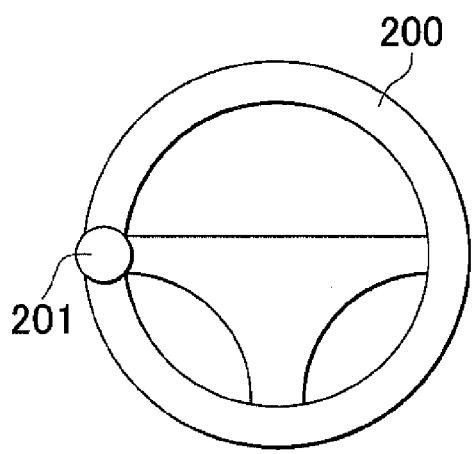
FIG. 10A is a view schematically illustrating a steering wheel and a knob in related art when the steering wheel is at the neutral position.
Figure 10B:
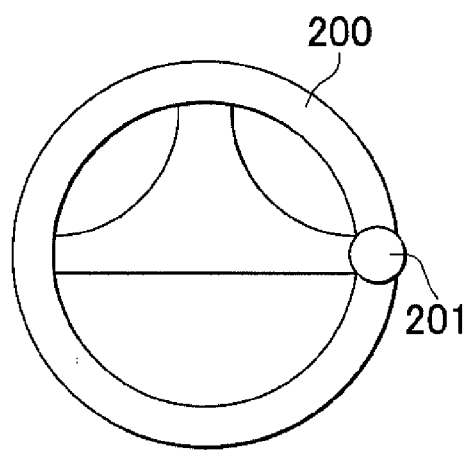
FIG. 10B is a view schematically illustrating the steering wheel and the knob in the related art when the turning angle of the steering wheel is a turning angle at which it is difficult to operate the steering wheel with the use of the knob.

FIG. 9 is a flowchart illustrating the operation of the target steered angle setting unit 61. The process in FIG. 9 is repeatedly executed with prescribed computation period. First, the target steered angle setting unit 61 acquires a detected steering angle θh detected by the steering angle sensor 34 (step S1). Then, the target steered angle setting unit 61 determines whether the lever 12 is operated (tilted) to the left on the basis of an output signal s1 from the first detector 91 (step S2). When it is determined that the lever 12 is not operated to the left (NO in step S2), the target steered angle setting unit 61 determines whether the lever 12 is operated (tilted) to the right on the basis of an output signal s2 from the second detector 92 (step S3). When it is determined that the lever 12 is not operated to the right (NO in step S3), the target steered angle setting unit 61 computes a control steering angle θh' according to Expression (1) (step S6).

$$\theta h'=(\theta h+A) \qquad \text{Expression (1)}$$

In Expression (1), A is a variable that is changed in step S4 or S5 (described later), and the initial value of the variable A is zero. The changed value of A is stored and used in the subsequent computation period. The control steering angle θh' is a steering angle used to compute the target steered angle θt*. The control steering angle θh' is equal to the detected steering angle θh detected by the steering angle sensor 34 when the variable A is zero, but is different from the detected steering angle θh when the variable A is not equal to zero. When the control steering angle θh' is different from the detected steering angle θh and the target steered angle θt* is computed on the basis of the control steering angle θh', the rotation angle of the rotary shaft 21 (the turning angle of the steering wheel 11) corresponding to the neutral position (θt=0) of the rear wheels 5 is different from the reference angle of the rotary shaft 21.

The target steered angle setting unit 61 computes the target steered angle θt* according to Expression (2) (step S7). The process in the present computation period ends.

$$\theta t^*=(\alpha/360)\times\theta h' \qquad \text{Expression (2)}$$

In Expression (2), α is a prescribed positive value. The value α is set to 35, for example. The target steered angle θt* when the control steering angle θh' is a positive value is set to a positive value, and the target steered angle θt* when the control steering angle θh' is a negative value is set to a negative value. The target steered angle θt* is proportional to the control steering angle θh'.

When it is determined in step S2 that the lever 12 is operated to the left (YES in step S2), the target steered angle setting unit 61 increases the variable A by a prescribed value β (step S4). The prescribed value β is a positive value and is set to, for example, 5°. The target steered angle setting unit 61 computes the control steering angle θh' according to Expression (1) (step S6). Thus, the control steering angle θh' is changed to a value greater by the prescribed value β than the immediately preceding control steering angle θh'. Then, the target steered angle setting unit 61 computes the target steered angle θt* according to Expression (2) (step S7). Thus, the target steered angle θt* is changed to a value greater by a prescribed value than the immediately preceding target steered angle θt*. As a result, the rear wheels 5 are steered in the left steering direction. Consequently, the vehicle body 2 is finely steered to the left. Then, the process in the present computation period ends.

When it is determined in step S3 that the lever 12 is operated to the right (YES in step S3), the target steered angle setting unit 61 decreases the variable A by the prescribed value β (step S5). The target steered angle setting unit 61 computes the control steering angle θh' according to Expression (1) (step S6). Thus, the control steering angle θh' is changed to a value smaller by the prescribed value β than the immediately preceding control steering angle θh'. Then, the target steered angle setting unit 61 computes the target steered angle θt* according to Expression (2) (step S7). Thus, the target steered angle θt* is changed to a value smaller by a prescribed value than the immediately preceding target steered angle θt*. As a result, the rear wheels 5 are steered to the right. Consequently, the vehicle body 2 is finely steered to the right. Then, the process in the present computation period ends.

When the variable A is set to zero that is the initial value, the operator operates the lever 12 to the left in a state where the steering wheel 11 is turned, for example, 180° in the opposite direction (right steering direction) from a reference turning angle of the steering wheel 11 corresponding to the neutral position of the rear wheels 5. In this case, the detected steering angle θh acquired in step S1 is −180°. Then, an affirmative determination is made in step S2, and then the variable A is increased by the prescribed value β in step S4. When the prescribed value B is five, the variable A is updated to five. Then, in step S6, the control steering angle θh' is changed. In this case, because the variable A is updated to five, the control steering angle θh' is expressed as θh'=θh+5=−175. Thus, the target steered angle θt* computed in step S7 is expressed as θt*=(α/360)×(−175). That is, the target steered angle θt* in this case is greater than the target steered angle θt*=(α/360)×(−180) when the lever 12 is not operated to the left.

Thus, even when the operator does not operate the steering wheel 11, the steered system motor 14 is controlled such that the steered angle θt increases. As a result, the rear wheels 5 are steered in the left steering direction. Consequently, the vehicle body 2 is finely steered to the left. In the subsequent computation period, the detected steering angle θh is acquired in step S1. If the steering wheel 11 is not operated between the immediately preceding computation period and the present computation period, the detected steering angle θh is maintained at −180°. When the lever 12 is continuously operated to the left, the process proceeds from step S2 to step S4 and the variable A is updated to a value "ten" that is greater than five by the prescribed value β. Then, the control steering angle θh' is computed in step S6. In this case, because the variable A is ten, the control steering angle θh' is equal to −170°. Then, the target steered angle θt* is computed in step S9. In this case, the target steered angle θt* is expressed as θt*=(α/360)×(−170). As a result, the vehicle body 2 is finely steered further to the left.

In the subsequent computation period, the detected steering angle θh is acquired in step S1. If the steering wheel 11 is not operated between the immediately preceding computation period and the present computation period, the detected steering angle θh is maintained at −180°. If the lever 12 is returned to the neutral position, a negative determination is made in each of step S2 and step S3, and the control steering angle θh' is computed in step S6. In this case, because the variable A is ten, the control steering angle θh' is equal to −170°. Then, the target steered angle θt* is computed in step S9. In this case, the target steered angle θt* is expressed as θt*=(α/360)×(−170). As a result, the target steered angle θt* is the same value as that in the immediately preceding computation period.

The control steering angle θh' computed by the target steered angle setting unit 61 is provided to the reaction force ECU 41 via the in-vehicle LAN 43. Specifically, each time the control steering angle θh' is computed in step S6 in FIG. 9, the computed control steering angle θh' is provided from the steered system ECU 42 to the reaction force ECU 41 via the in-vehicle LAN 43. The reaction force ECU 41 computes a target reaction torque, for example, on the basis of the control steering angle θh' provided by the steered system ECU 42, and executes drive control on the reaction force motor 22 such that the computed target reaction torque is generated by the reaction force motor 22.

While one embodiment of the invention has been described above, the invention may be implemented in various other embodiments. For example, in the above-described embodiment, the mechanism illustrated in FIG. 2 to FIG. 5 is used as the support mechanism 80 for the lever 12. However, a mechanism other than the mechanism illustrated in FIG. 2 to FIG. 5 may be adopted as long as the mechanism is able to support the lever 12 while maintaining the tilt direction of the lever 12 to the rightward direction and the leftward direction of the vehicle body 2 regardless of the turning angle of the steering wheel 11.

What is claimed is:

1. A vehicle steering system comprising:
   a steering member operated to steer a vehicle;
   an operating portion disposed on the steering member to operate the steering member;
   a support mechanism that supports and rotates the operating portion relative to the steering member such that the movable direction of the operating portion coincides with two prescribed directions relative to a vehicle body regardless of an operated state of the steering member;
   a first detector that detects a fact that the operating portion is operated in a first direction out of the two directions; and
   a second detector that detects a fact that the operating portion is operated in a second direction out of the two directions.

2. The vehicle steering system according to claim 1, wherein:
   the two directions are a leftward direction relative to the vehicle body and a rightward direction relative to the vehicle body; and
   the first direction is the leftward direction relative to the vehicle body, and the second direction is the rightward direction relative to the vehicle body.

3. The vehicle steering system according to claim 2, further comprising:
   a device that finely steers the vehicle body in the leftward direction when the first detector detects the fact that the operating portion is operated in the first direction; and
   a device that finely steers the vehicle body in the rightward direction when the second detector detects the fact that the operating portion is operated in the second direction.

4. The vehicle steering system according to claim 3, wherein the operating portion is a tiltable lever mechanism.

5. The vehicle steering system according to claim 4, wherein the operating portion is provided with an urging member that always urges the operating portion toward a neutral position.

6. The vehicle steering system according to claim 5, wherein the steering member is a turnable circular steering wheel.

7. The vehicle steering system according to claim 6, wherein:
   the vehicle steering system is a steer-by-wire system; and
   there is no mechanical connection between the steering wheel that serves as the steering member and a steering mechanism used to change a steered angle of steered wheels.

8. A forklift comprising the vehicle steering system according to claim 7.

9. The vehicle steering system according to claim 1, wherein the support mechanism includes a gear mechanism.

* * * * *